Oct. 1, 1957     R. J. ZUTI ET AL     2,808,565

HIGH VOLTAGE INDICATOR

Filed June 14, 1955

INVENTORS
RUDOLPH J. ZUTI &
PAUL DEMOCKO

BY *W. B. Harpman*

ATTORNEY

United States Patent Office 2,808,565
Patented Oct. 1, 1957

2,808,565
HIGH VOLTAGE INDICATOR

Rudolph J. Zuti and Paul Democko, Youngstown, Ohio

Application June 14, 1955, Serial No. 515,306

2 Claims. (Cl. 324—122)

This invention relates to an indicator and more particularly to an indicator for determining the presence of high voltage current either direct or alternating.

The principal object of the invention is the provision of a simple and compact high voltage A. C.-D. C. indicator.

A further object of the invention is the provision of a high voltage A. C.-D. C. indicator that will indicate A. C. voltage that is high enough to form a magnetic field of sufficient intensity to light a neon bulb introduced thereinto and indicate direct current voltage that is high enough to start a corona action, the discharge of which is sufficient to move a pointer.

A still further object of the invention is the provision of an A. C.-D. C. high voltage indicator in a compact probe form which may be utilized in testing various circuits in a television receiver or transmitter and similar equipment to determine the presence of high A. C. and D. C. voltage.

A still further object of the invention is the provision of a high voltage A. C.-D. C. indicator that may be inexpensively formed of relatively simple materials.

The high voltage A. C.-D. C. indicator disclosed herein is designed to indicate the presence of high D. C. and/or A. C. currents in electronic equipment in conjunction with the testing of the circuits of said equipment to determine whether or not irregularities exist therein. For example, a technician testing a defective television receiver can readily probe the various circuits in the receiver with the indicator disclosed herein and determine the circuits which are complete and those which are interrupted and thereby readily locate defective circuit components in the receiver.

The indicator operates on the principle that a neon bulb will glow when introduced into the magnetic field created by a high voltage A. C. circuit and that a high voltage D. C. circuit will produce a corona effect or action which is sufficiently strong to move a pointer which is spring biased to a predetermined position. The operation of the indicator quickly and accurately indicates the presence of either high A. C. or D. C. voltage by either lighting the neon bulb incorporated therein, as in the presence of high A. C. voltages, or moving the pointer therein as in the case of high D. C. voltages. In the latter instance, the indicator may be, and preferably is, calibrated to indicate the approximate strength of the D. C. voltage.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the function and scope of the invention.

The invention is illustrated in the accompanying drawing, wherein:

Figure 1 is a perspective view of the high voltage A. C.-D. C. indicator.

Figure 1:
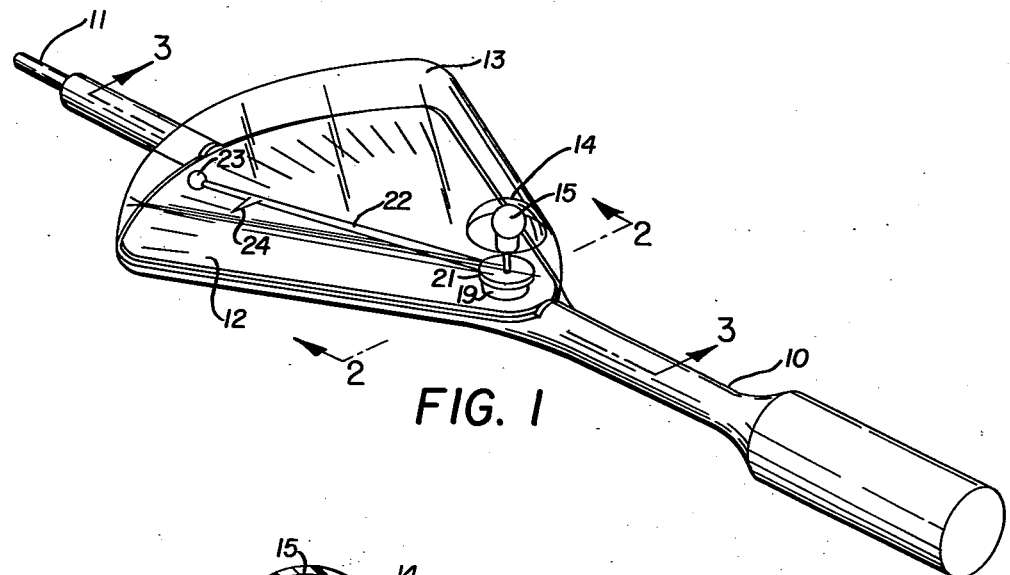
Figure 2:
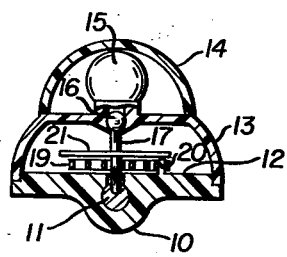
Figure 2 is a cross section taken on line 2—2 of Figure 1.
Figure 3:
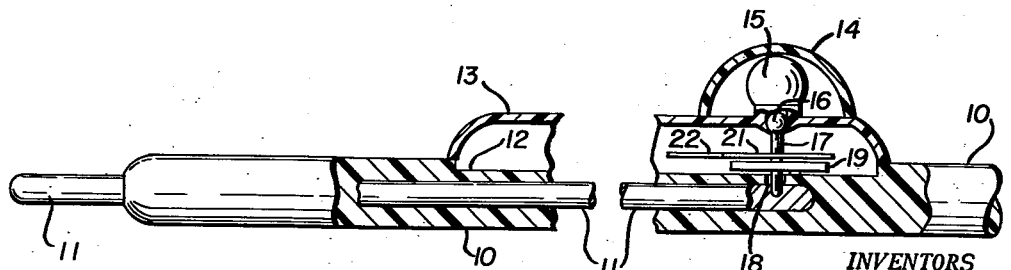
Figure 3 is a cross section taken on line 3—3 of Figure 1 with parts broken away.

By referring to the drawings and Figure 1 in particular it will be seen that the indicator comprises an elongated handle 10 formed of dielectric material such as a synthetic resin capable of being molded and enclosing throughout a portion of its length a major portion of a metal probe 11, an end of which extends beyond the end of the handle 10. An intermediate portion of the elongated handle 10 is widened and flattened transversely to form a dial surface 12 and a transparent housing 13 is disposed thereover in registry therewith and cemented thereto as known in the art.

The transparent housing 13 has a flattened upper surface and supports a secondary housing 14 thereon, which secondary housing 14 is also formed of transparent material and encloses a neon bulb 15 which is carried on the upper surface of the transparent housing 13 in a socket 16 formed therein. The socket 16 forms an upper journal for a metallic shaft 17 which is journaled at its lower end in an opening 18 in the flat dial surface 12 and engaged against the probe 11 which forms a conductor.

The upper end of the shaft 17 is rounded to avoid corona discharge and is spaced with respect to the neon bulb 15 by the socket 16 which is also formed of dielectric material. A coiled spring 19 (similar to the hair spring in a watch) is secured at its inner end to the shaft 17 which is rotatably mounted in its journals and the outer end of the spring 19 is engaged against a boss 20 formed on the flat dial surface 12.

A disc 21 is secured to the shaft 17 and a pointer 22 extends from the disc and terminates in a rounded end 23 which avoids corona discharge therefrom and has an intermediately positioned sidewardly extending corona discharge point 24.

The spring 19 normally urges the pointer 22 toward the left hand side of the flat dial surface 12, as shown in Figure 1 of the drawings, and corona discharge of a high D. C. voltage current from the point 24 will overcome the spring action and cause the pointer 22 to move to the right (clockwise) as shown in Figure 1 of the drawings.

The pointer 22 will indicate the intensity of the D. C. voltage by the degree of movement thereof and calibrations may accordingly be formed on the flat dial surface 12 indicating high, low, good or bad, as may be desired, so that a technician utilizing the indicator may not only determine the presence of high voltage D. C. current in a circuit but may also determine the approximate amount thereof.

A modification of the form of the invention herein disclosed may be made to increase the sensitivity of the high D. C. voltage indicator by the formation of one or more additional discharge points on the pointer and in the area thereof around the pivot means of the pointer, each of the additional points extending sidewardly from the area of the pointer about the pivot thereof and angularly disposed thereto so that such corona discharge as occurs from these additional points will tend to revolve the portion of the pointer adjacent the pivot in the same direction as the principal corona discharge from the principal discharge point on the pointer. For example, it has been determined that four of such supplemental discharge points spaced circumferentially around the circular base of the pointer and formed at angles outwardly therefrom will impart additional force to the pointer and stabilize the same with respect to wobble and vibration which sometimes occurs from the corona discharge from the single discharge point on the pointer.

It will be obvious to those skilled in the art that the high voltage A. C.-D. C. indicator disclosed herein will thus enable a ready determination of the presence of high A. C. or D. C. currents in electronic equipment and that the device is of simple construction capable of economic manufacture and accordingly meets the several objects of the invention.

Having thus described our invention, what we claim is:

1. A high voltage indicator comprising an elongated dielectric member, a conductor disposed longitudinally in said dielectric member and extending outwardly of one end to form a probe, a transversely widened and flattened portion intermediate the ends of said dielectric member, and a transparent housing disposed thereover in spaced relation thereto and secured at its edges to said transversely widened and flattened portion, said widened and flattened portion of said dielectric member having an opening therein and said transparent housing having an opening therein in oppositely disposed relation with respect to the opening in said widened and flattened portion, a shaft journaled in said openings, one end of said shaft engaging said conductor, a pointer secured to said shaft at right angles thereto, a point on said pointer at right angles thereto and sidewardly therefrom, a coil spring secured to said shaft and disposed thereabout with an end thereof secured to said body member, said coil spring urging said pointer in the direction of said point thereon, a neon bulb disposed on said housing over said opening in which said shaft is journaled therein, a secondary transparent housing secured to said transparent housing and enclosing said neon bulb, indicia on said transversely widened and flattened portion of said body member beneath said pointer, the outermost end of said pointer being spherical.

2. A high voltage indicator comprising an elongated dielectric member, a conductor disposed longitudinally in said dielectric member and extending outwardly of one end to form a probe, a transversely widened and flattened portion inwardly from one end of said dielectric member, and a transparent housing disposed thereover and secured to said transversely widened and flattened portion, said widened and flattened portion of said dielectric member having an opening therein and said transparent housing having an opening therein in oppositely disposed relation thereto, a shaft journaled in said openings, one end of said shaft engaging said conductor, a pointer secured to said shaft at right angles thereto, a point on said pointer at right angles thereto and sidewardly therefrom, a coil spring secured to said shaft and disposed thereabout with an end thereof secured to said body member, said coil spring urging said pointer in the direction of said point thereon, indicia on said transversely widened and flattened portion of said body member beneath said pointer, the outermost end of said pointer being spherical.

References Cited in the file of this patent

UNITED STATES PATENTS

| 830,938 | Taylor | Sept. 11, 1906 |
| 1,867,944 | Nijland | July 19, 1932 |
| 2,632,785 | Knopp | Mar. 24, 1953 |

FOREIGN PATENTS

| 12,973 | Great Britain | July 18, 1900 |